United States Patent [19]

Carter et al.

[11] Patent Number: 5,030,503
[45] Date of Patent: Jul. 9, 1991

[54] REFLECTIVE PATTERNED GLASS PRODUCT AND COATING METHOD

[75] Inventors: Thomas M. Carter, Valencia; Peter J. McQuillin, Upper St. Clair, both of Pa.

[73] Assignee: PPG Industries, Inc., Pittsburgh, Pa.

[21] Appl. No.: 401,905

[22] Filed: Sep. 1, 1989

[51] Int. Cl.$^5$ .................................................. B32R 9/00
[52] U.S. Cl. .................................... 428/195; 428/210; 428/426; 428/432; 52/171; 427/162
[58] Field of Search ................. 52/171; 428/195, 210, 428/426, 432; 427/162

[56] References Cited

U.S. PATENT DOCUMENTS

| | | | |
|---|---|---|---|
| Re. 25,312 | 1/1963 | Duncan et al. | 106/52 |
| 3,107,117 | 10/1963 | Mizelle | 297/89 |
| 3,185,586 | 5/1965 | Saunders et al. | 117/54 |
| 3,296,004 | 1/1967 | Duncan et al. | 106/52 |
| 3,660,061 | 5/1972 | Donley et al. | 428/432 |
| 3,869,198 | 3/1975 | Ballentine | 350/259 |
| 3,951,525 | 4/1976 | Ballentine | 350/259 |
| 4,263,335 | 4/1981 | Wagner et al. | 427/168 |
| 4,394,064 | 7/1983 | Dauson | 350/259 |
| 4,478,905 | 10/1984 | Neely, Jr. | 428/324 |
| 4,610,115 | 9/1986 | Thompson, Jr. | 52/171 |

OTHER PUBLICATIONS

Newsline, 10/89, p. 24.
Glass Magazine, Is It Curtains for Curtain Wall, 2-90, pp. 36-38.

Primary Examiner—Patrick J. Ryan
Attorney, Agent, or Firm—Donna L. Seidel

[57] ABSTRACT

A patterned light and heat reflective product comprising a substrate with a discontinuous pattern coating in combination with a light and heat reflective coating is disclosed, along with a method for its production.

20 Claims, 1 Drawing Sheet

REFLECTIVE PATTERNED GLASS PRODUCT AND COATING METHOD

BACKGROUND OF THE INVENTION

Curtainwall architecture comprises both vision areas and opaque areas referred to as spandrels. Spandrel areas are formed by panels which are either intrinsically opaque or made opaque by the inclusion of an opaque coating or backing material. Spandrel panels are generally employed to conceal portions of the structure of a building which are not aesthetically pleasing if visible from the exterior of the building. For example, spandrel panels may be used to conceal floor slabs, air conditioning equipment, heating ducts and so on. Spandrel panels may also be used to maintain privacy or security, e.g., at the ground level of a building.

A variety of spandrel panels that closely match or pleasingly contrast in color and reflectivity with adjacent transparent glass panels in curtainwall construction have been developed. Increasing use of highly reflective transparent metal and metal oxide coatings has led to the development of matching spandrel panels. U.S. Pat. No. 3,869,198 discloses spandrel panels provided with a transparent light and heat reflective coating on the outwardly glazed glass surface and a substantially opaque ceramic enamel coating adhered to the inwardly glazed glass surface. These spandrels provide for aesthetically matched vision and spandrel areas in curtainwall construction by utilizing a ceramic enamel coating which reflects light in the same spectral region as the light transmitted by the transparent coating and glass combination U.S. Pat. No. 3,951,525 discloses spandrel panels with transparent light and heat reflective coatings on the inwardly glazed glass surface and with substantially opaque ceramic enamel coatings adhered to the transparent light and heat reflective coatings. The spandrels are aesthetically matched to vision areas in curtainwall construction by utilizing a ceramic enamel coating which reflects light in the same spectral region as light transmitted by the transparent coating.

In some architectural installations, it is desirable to have a spandrel panel which has a different surface appearance from the high reflectivity of a metal or metal oxide coating or the glossiness of glass. U.S. Pat. No. 4,394,064 to Dauson discloses a durable spandrel panel comprising a rigid panel substrate, a ceramic enamel coating of a desired color, and a transparent protective metal oxide overcoating. In some applications, the substrate is preferably transparent, so that the color of the ceramic enamel coating is visible from both the exterior and the interior of the building. Glass is a particularly desirable substrate.

SUMMARY OF THE INVENTION

In some architectural installations, it is desirable to have a glass product which has a patterned appearance allowing some light transmittance, in conjunction with a light and heat reflective coating. The present invention provides a durable glass panel comprising a transparent glass substrate, a discontinuous ceramic enamel pattern coating on at least one surface thereof, and a continuous, transparent light and heat reflective coating, preferably over the ceramic enamel pattern coating.

DESCRIPTION OF THE PREFERRED EMBODIMENTS

Figure 1:
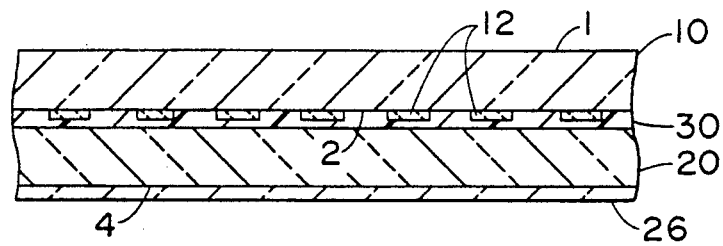
FIG. 1 illustrates a discontinuous pattern 12 on surface 2 of transparent substrate 10. Transparent substrate 20 has a light and heat reflective transparent film 26 on surface 4. The space 30 between substrates 10 and 20 may be filled by a polymeric interlayer material which laminates the substrates together or a gas which separates the two substrates.

Preferred glass panels in accordance with the present invention comprise a transparent glass substrate coated with a pattern of colored ceramic enamel material deposited by a screen printing process combined with a second transparent light and heat reflective coating deposited by any conventional coating process such as pyrolytic deposition, wet chemical deposition, chemical vapor deposition, etc. A preferred method of depositing the reflective coating is magnetron sputtering. The panel substrate may be any suitable glass material, but is preferably clear flat glass. Typical soda-lime-silica glasses are preferred. However, tinted glasses may also be employed, such as the heat-absorbing glasses sold by PPG Industries, Inc. under the trademarks SOLEX, SOLARBRONZE and SOLARGRAY, the latter two being described in U.S. Pat. No. 3,296,004 and U.S. Pat. No. Re. 25,312 respectively.

In a preferred embodiment of the present invention, the screen printed pattern is combined with a continuous transparent light and heat reflective coating so that the glass surface is completely covered, thereby forming a patterned light and heat reflective product. If a glassy external appearance is desired, the patterned coating is applied by screen printing onto a surface of the glass substrate, then the reflective coating is applied over the entire patterned coated surface and the panel is installed with the coated surface inward. When viewed from the uncoated glass side, a glassy patterned appearance is observed. If a more reflective external appearance is desired, the glass panel is installed with the coated surface outward. When viewed from the coated side, a highly reflective patterned appearance is observed. The printed pattern may comprise multiple colors applied in a plurality of screen printing process steps.

In accordance with a preferred embodiment of the present invention wherein a non-glassy patterned appearance is desired, flat glass sheets supported on a horizontal conveyor are moved through a series of operations. First the glass sheets may be moved through a washer where detergent solutions and rotating brushes may be used to remove any dirt from the surface of the glass sheets, which are then dried with air. The glass panel is subjected to screen printing, wherein a patterned coating is screen printed onto the glass surface, preferably using ceramic glass enamel colorants. The screen printing process may be carried out in multiple steps using different screens and colorants to reproduce any particular pattern. The screen printed coating is then dried and fired. The pattern coated glass panel is then overcoated with a light and heat reflective film, preferably by magnetron sputtering. The film may comprise a metal, metal oxide, metal nitride or other metal compound, and may be a single or multiple layer coating. Further, the film may be high or low visible reflectance and either colorless or preferably colored.

The ceramic enamel coating composition may comprise a ceramic frit such as lead borosilicate. Typical constituents in the ceramic enamels employed in the coatings for the spandrels of the present invention include oxides, nitrates, sulfates, carbonates or other compounds of aluminum, silicon, boron, lead, potassium, sodium, lithium, calcium, barium, zinc, magnesium, strontium and the like. Other constituents which may be present in the ceramic enamel to impart color or opacity to the ceramic enamel include pigment compounds of titanium, cobalt, manganese, chromium, copper, iron, lead, selenium, nickel, zinc, cadmium, gold, antimony, magnesium, zirconium and so on. Suitable ceramic enamel compositions are available in a variety of colors from commercial suppliers such as O. Hommel of Carnegie, Pa. or Drakenfeld of Washington, Pa.

Opaque ceramic enamel coatings in a wide variety of desirable colors may be prepared in accordance with the present invention. Particularly preferred colors for the background coatings of the present invention are black, white and gray. Preferred colors for the patterned screen printed coating include, in addition to black and white, green, brown, blue and gray for harmonizing with colored, reflective, transparent, coated glass windows, and red, yellow and blue for multiple screen printing to reproduce photographic images of natural materials such as granite and marble.

The ceramic enamel compositions are preferably applied to a glass substrate at room temperature, dried to evaporate the liquid vehicle, and fired to remove residual organic material and bond the coating to the substrate.

The ceramic enamel pattern may be overcoated with a light and heat reflective film by a pyrolytic technique, such as those described in U.S. Pat. Nos. 3,107,117 3,185,586; 3,660,061 and 4,263,335, whereby the patterned ceramic enamel coated panel is contacted with an organometallic coating reactant capable of thermal decomposition to a metal oxide at a sufficiently high temperature to effect decomposition of the organometallic coating reactant to form a metal oxide film over the ceramic enamel coating. The metal oxide film is preferably colored and highly reflective. A variety of metal oxides may be used. Preferably, the ceramic enamel pattern is overcoated with a light and heat reflective metal film by magnetron sputtering. Many such coatings are known in the art, and the ceramic enamel pattern coated glass panel may be subjected to the process in the same manner as an uncoated glass substrate. The coating may comprise metal, metal oxide, metal nitride or other metal compounds in either a single or multiple layer coating which may have high or low visible reflectance and may be colorless or, preferably, colored.

While annealed coated products may be used in some applications, the preferred product in accordance with the present invention is at least partially tempered. In a most preferred embodiment, a glass substrate is coated with a patterned ceramic enamel coating, fired to fuse the ceramic, quenched to obtain a semi-tempered state, and coated with a light and heat reflective coating by magnetron sputtering.

The present invention will be more fully understood from the descriptions of specific examples which follow.

EXAMPLE I

A discontinuous pattern is applied to a surface of a glass substrate, dried, and fired. A metallic film is applied to a surface of a separate glass substrate. The two glass substrates are then laminated with the pattern on the inward surface of the first glass substrate and the metallic film on exterior surface of the second glass substrate. This example is illustrated in FIG. 1.

EXAMPLE II

Figure 2:
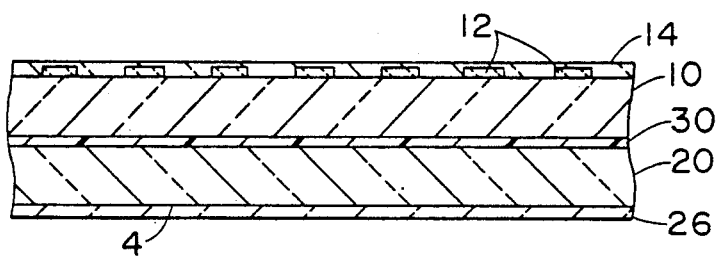
FIG. 2 illustrates a discontinuous pattern 12 on surface 1 of transparent substrate 10 overcoated with a transparent protective film 14. A second transparent substrate 20 has a light and heat reflective film 26 on surface 4.

A discontinuous pattern is applied to a surface of a glass substrate, dried, and fired. A protective pyrolytic film is then applied directly on top of the fired pattern. A reflective metallic film is applied to a surface of a second glass substrate. The two glass substrates are then laminated with the pattern plus protective film on the exterior surface of the first substrate and the reflective metallic film on exterior surface of the second substrate. This example is illustrated in FIG. 2.

EXAMPLE III

Figure 3:
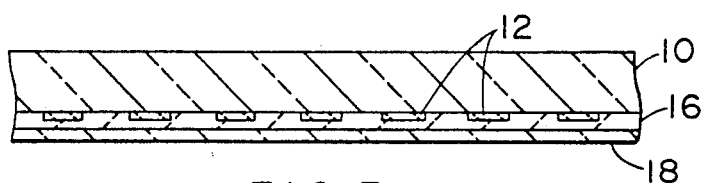
FIG. 3 illustrates a single transparent substrate 10 with a discontinuous pattern coating 12 overcoated with a light and heat reflective coating 16, and covered with a protective layer 18.

A discontinuous pattern is applied to a glass surface, dried, and fired. A reflective metallic film is applied directly over the pattern. An opacifier/protective layer is then applied over the metallic film, either as a coating or a sheet material applied with adhesive. This panel may be used monolithically or as part of an insulated glass unit, and is illustrated in FIG. 3.

EXAMPLE IV

Figure 4:
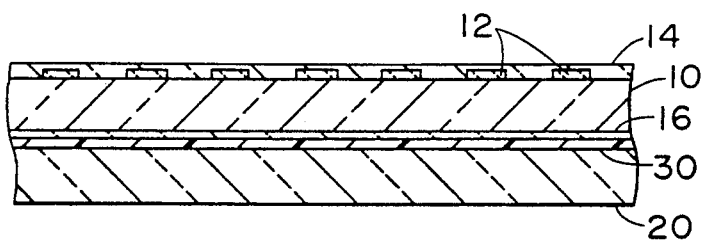
FIG. 4 shows an article having a discontinuous pattern coating 12 overcoated with a transparent protective film 14 on surface 1 of transparent substrate 10 and a light and heat reflective film 16 on surface 2, with a second transparent substrate 20 assembled with space 30 being either an interlayer laminating the two substrates together or a gas filled space separating them.

A discontinuous pattern is applied to a glass surface, dried, and fired. A protective pyrolytic film is then applied directly on top of the fired pattern. A reflective metallic film is applied to the opposite surface of the glass sheet. The coated glass is then laminated to another glass sheet with the pattern plus protective film on the exterior surface and the reflective metallic film on interior surface. This example is illustrated in FIG. 4.

EXAMPLE V

Figure 5:
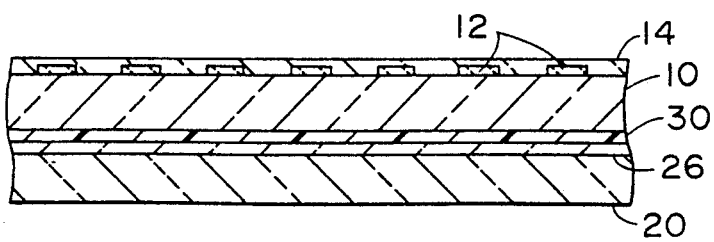
FIG. 5 shows an article with a discontinuous pattern 12 overcoated wIth a transparent protective film 14 on surface 1 of transparent substrate 10 assembled with a second substrate 20 with a light and heat reflective film 26 on surface 3.

A discontinuous pattern is applied to a glass surface, dried, and fired. A protective pyrolytic overcoat is then applied directly on top of the pattern. A reflective metallic film is applied to a surface of a second glass substrate. The two glass substrates are laminated with the pattern/protective overcoat on the exterior surface of the first sheet and the reflective metallic film on the inward surface of the second sheet. This example is illustrated in FIG. 5.

The above examples are offered to illustrate the present invention. A wide variety of colorants may be employed in the screen printing process, and the screens may be prepared from abstract, pictorial, geometric or other created artwork as well as photographically from natural materials such as granite and marble, as well as man-made materials. The patterned coating may be applied by methods other than screen printing, using pattern coating means other than screens, such as roll or pad printing. The scope of the present invention is defined by the following claims.

We claim:

1. An article of manufacture for use as an architectural product comprising:
   a. a transparent substrate;
   b. a discontinuous pattern coating on a surface of said substrate; and
   c. a continuous transparent light and heat reflective coating on a surface parallel with said pattern coating.

2. An article according to claim 1, wherein said substrate is glass.

3. An article according to claim 2, wherein said pattern coating comprises ceramic enamel colorants.

4. An article according to claim 3, wherein said reflective coating is deposited on said transparent substrate.

5. An article according to claim 4, wherein said continuous transparent light and heat reflective coating is deposited on the surface of said substrate opposite the surface on which said pattern coating is applied.

6. An article according to claim 4, wherein said discontinuous pattern coating is screen printed on said glass surface and said continuous transparent light and heat reflective coating is deposited over said pattern coating.

7. An article according to claim 1, wherein said discontinuous pattern coating is on a surface of a first transparent substrate, and said reflective coating is on a surface of a second substrate.

8. An article according to claim 7, wherein said second substrate is glass.

9. An article according to clam 8, which further comprises a transparent metal oxide protective coating.

10. An article according to claim 9, wherein said transparent metal oxide protective coating is tin oxide.

11. A method for producing a pattern coated light and heat reflective product comprising the steps of:
    a. applying a discontinuous pattern coating onto a surface of a glass substrate; and
    b. applying a continuous transparent light and heat reflective coating on a surface of a substrate parallel with the pattern coated surface of said glass substrate.

12. A method according to claim 11, wherein said discontinuous pattern coating comprises ceramic enamel colorants.

13. A method according to clam 12, wherein said discontinuous pattern coating is applied to the substrate by screen printing, and said continuous transparent light and heat reflective coating is applied over the pattern coated surface.

14. A method according to claim 12, wherein said discontinuous transparent light and heat reflective coating is applied to the substrate by magnetron sputtering.

15. A method according to claim 12, wherein said pattern coating is opaque.

16. A method according to claim 15, wherein said continuous transparent light and heat reflective coating is colored.

17. A method according to claim 13, wherein said substrate is colorless glass.

18. A method according to claim 17, wherein said substrate is tinted heat absorbing glass.

19. A method according to claim 14, wherein said pattern coated and light and heat reflective coated product is further coated with a transparent protective coating.

20. A method according to claim 19, wherein said transparent protective coating comprises tin oxide.

* * * * *

UNITED STATES PATENT AND TRADEMARK OFFICE
CERTIFICATE OF CORRECTION

PATENT NO.   : 5,030,503
DATED        : July 9, 1991
INVENTOR(S)  : Thomas M. Carter and Peter J. McQuillin It is certified that error appears in the above-identified patent and that said Letters Patent is hereby corrected as shown below:

Column 6, claim 14, line 2, delete "discontinuous" and insert --continuous--.

Signed and Sealed this

Sixth Day of October, 1992

*Attest:*

DOUGLAS B. COMER

*Attesting Officer*         Acting Commissioner of Patents and Trademarks